Jan. 8, 1963    F. KUGEL ETAL    3,072,222
HYDRODYNAMIC BRAKE AND METHOD OF OPERATING THE SAME
Filed Aug. 15, 1960    3 Sheets-Sheet 1

Jan. 8, 1963    F. KUGEL ETAL    3,072,222
HYDRODYNAMIC BRAKE AND METHOD OF OPERATING THE SAME
Filed Aug. 15, 1960    3 Sheets-Sheet 2

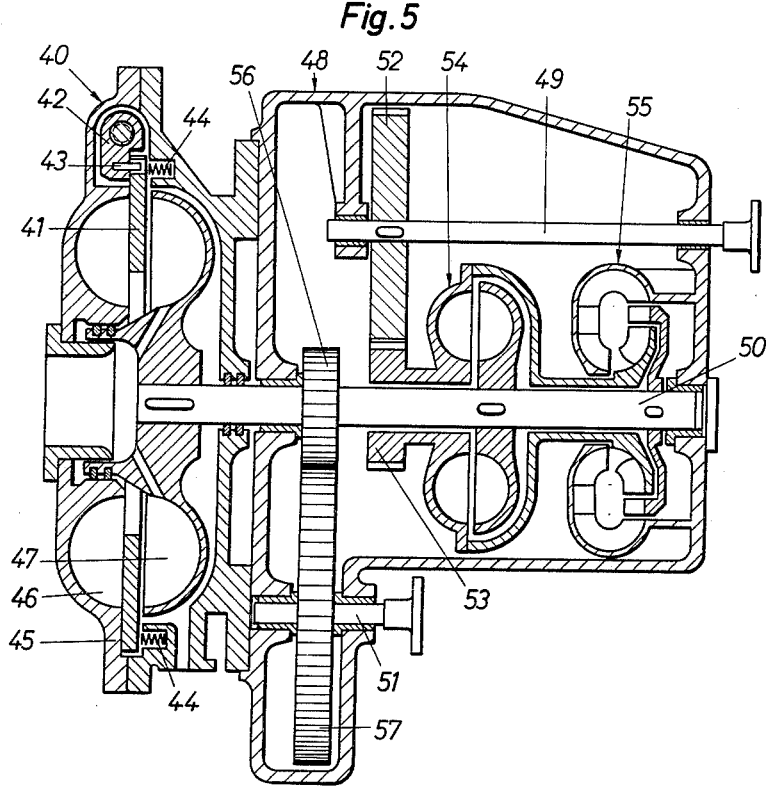

United States Patent Office 3,072,222
Patented Jan. 8, 1963

3,072,222
HYDRODYNAMIC BRAKE AND METHOD OF OPERATING THE SAME

Fritz Kugel and Helmut Müller, Heidenheim (Brenz), Germany, assignors to J. M. Voith G.m.b.H., Heidenheim (Brenz), Germany
Filed Aug. 15, 1960, Ser. No. 49,714
Claims priority, application Germany Aug. 17, 1959
5 Claims. (Cl. 188—90)

The present invention relates to a method of operating a hydrodynamic brake and also to the structure of such hydrodynamic brake which is provided with a multi-part cover slide adapted to be inserted into the fluid chamber between the bladed primary part and the bladed secondary part. While not limited to vehicles, especially vehicles with fluid transmissions, the present invention is particularly advantageous for use in connection therewith.

Stationary hydrodynamic brakes, frequently also designated as water brakes, will during their entire period of operation exert a braking effect and may be used to ascertain the brake horsepower. In order to control the brake horsepower of such hydrodynamic brakes, it is customary among others to vary the degree of filling or, when constant filling is involved, to separate more or less from each other the bladed primary and secondary parts by cover slides or valves insertable between the said two parts.

A water brake has heretofore been suggested in which the load control is always effected with a filled water chamber by means of rectilinearly guided cover slides. For purposes of adjusting the minimum output, the brake is completely emptied.

It was self-suggestive to employ hydrodynamic brakes also in connection with vehicles. In this way, for instance the braking during downhill driving by means of brake shoes could be avoided which is advantageous inasmuch as the brake shoe wear is considerable and means high service expenses.

The stationary water brake, which is coupled for instance to a motor, has as mentioned above the sole task to ascertain the output of the motor during operation. In contrast thereto, the hydrodynamic vehicle brake has a double task during driving operation, namely in the first place the vehicle has to be braked and in the second place it must be possible when driving at full power to eliminate the braking effect almost completely with regard to the degree of efficiency of the power transmission. The last mentioned condition does not have to be met by the stationary water brake because the brake horsepower zero is meaningless for the ascertainment of the power output.

The control of the hydraulic brake of vehicles is expediently effected by means of a change in the filling. Since, however, vehicles require a braking only during a portion of their operation, it is necessary that in the remaining time of operation the brake is empty. If with empty brake the primary part is rotated, the air in the fluid chamber is by the primary blading whirled around to such an extent that a considerable torque is exerted upon the stationary secondary blading. As a result thereof, power output losses are encountered which with an empty brake may amount up to 7% of the rated power of the transmission. While the elimination of this air whirl loss has been obtained by detaching the controllable dynamic brake from the transmission during normal operation, the said separating coupling has caused considerable difficulties inasmuch as it can be shifted, when designed as jaw clutch, only when the transmission is at a standstill. When designing the separating clutch as disc clutch, considerable shifting power is required in view of the great masses, which great shifting power will cause considerable difficulties during the shifting operation in view of the heat withdrawal.

It is furthermore known to eliminate air whirl losses by causing said secondary wheel to rotate during brake-free operation. Such devices, however, are relatively expensive as to manufacture and service and also have power losses inherent thereto.

It is, therefore, an object of the present invention to provide a method and a hydrodynamic brake which will overcome the above mentioned drawbacks.

It is another object of this invention to provide a hydrodynamic brake and a method of operating same which will make it possible almost completely to eliminate the air whirl losses while fully retaining the braking possibilities.

These and other objects and advantages of the invention will appear more clearly from the following specification in connection with the accompanying drawings, in which:

FIG. 5 is a longitudinal section through a single brake in the present invention in conjunction with a fluid transmission, which is to be braked.

Figure 1:
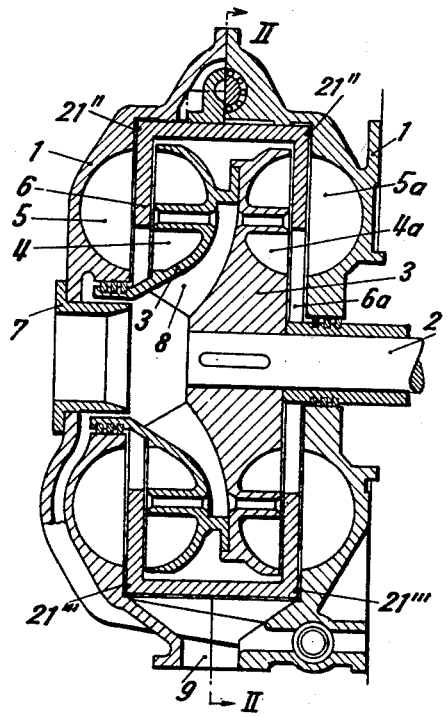
FIG. 1 is a longitudinal section through a double brake according to the present invention, said section being taken along the line I—I of FIG. 2.

The above outlined objects have been realized by the method according to the present invention according to which for controlling the braking effect at completely disengaged cover slide, the filling of the fluid chamber is varied in a manner known per se; only when operating without brake, i.e. when the brake is empty, the cover slide will be made effective.

When the cover slide is made effective or moved into its operative position, the air in the brake cannot pass any longer from the primary part to the secondary part. According to this method, only two positions are necessary for the multi-part displaceable cover slide, namely the operative position and the inoperative position, whereby the actuation and control of the cover slide will be considerably simplified.

A further advantage of the method according to the present invention is seen in the fact that the cover slide is during the braking operation never made effective, in other words, it is never made effective during an operation at which great forces will occur (destruction of the kinetic and potential energy of the vehicle). The cover slide is rather made effective only when the fluid chamber of the brake is empty. The forces of the air whirls are, however, extremely low with regard to the above mentioned braking force. Accordingly, the cover slide may be of light construction. Also the guiding of the parts of the cover slide may be correspondingly simple. As to the shape and the cover up conditions of the cover slide, it should be noted that cover slides are known which are delimited by straight lines and arcs. It is disadvantageous that the heretofore known embodiments require considerable space when the parts of the cover slide are to be fully taken advantage of for producing the full braking horsepower. The braking housing is, therefore, relatively large.

For purposes of avoiding the above mentioned drawbacks and in order to solve the problem indicated above, in conformity with the present invention the braking device for carrying out the method is so constructed that the parts of the multi-part cover slide are displaceable radially to the brake shaft in a manner known per se so that the said parts of the cover slide which in engaged condition are located adjacent to each other will have straight edges and that the contour of the cover slide parts facing the brake shaft will in their intermediate range be formed by an arc the radius of which will be equal or approximately equal to the outer radius of the bladed fluid chamber. The two end ranges of this contour are offset radially inwardly with regard to the above mentioned arc shape. This deviation from the arc shape may consist for instance in a rectilinear incline or the end ranges may have a smaller radius than the intermediate range. When the cover slide is in its effective position, the other straight portions of those slide sides which face the brake shaft engage each other and thus there remains non-covered merely an ellipse-like passage between the primary and second blading. The now non-covered portion of the blading is, however, smaller than is the case with the heretofore known arrangements and is practically negligible inasmuch as the non-covered portions are now located on small diameters of the blading. When the cover slides are in their ineffective position, the intermediate area of that contour which faces the brake shaft covers the outer circumference of the blading either entirely or approximately entirely. Merely the outer areas of this contour extend as corners between the primary and the secondary blading.

These protruding corners, however, do nearly not at all affect the full braking power because the corners only relatively immaterially reduce the effective blading surfaces and thereby the braking power. In effective position of the cover slides, however, the contour facing the brake shaft is better adapted to the inner diameter of the blading and is more effective with regard to the covering than a contour which consists merely of an arc equalling the outer diameter of the blading. In this way, with emptied brake, the ventilation losses are practically eliminated.

In order to assure that with the brake emptied and the cover slide moved into its effective position, no air whirl losses will occur due to leakage between the primary and secondary part of the brake, the cover slide parts are advantageously pressed against the stationary secondary blading by means of springs. The sealing effect may be increased by the employment of standard sealing elements such as sealing lips.

If the hydrodynamic brake is to meet actual requirements, it must be able to yield the full braking moment at a speed which is considerably below the maximum speed. When a rail vehicle is to reach for instance a maximum speed of 120 kilometers per hour, a downhill drive at which the above mentioned brake is to be effected will be effected at a considerably lower speed. Therefore, at a speed of perhaps 40 kilometers per hour, a satisfactory brake torque must be developed. In order nevertheless to be able to keep the dimensions of the hydraulic brake small, the speed of the brake is selected as high as possible. Accordingly, the brake shaft is in advantageous manner connected to a fast running transmission shaft. If a fluid transmission is present, the secondary shaft is expediently used for connecting the brake, and preferably the fastest running secondary shaft is selected for this purpose.

When braking in double arrangement, each of the two fluid chambers is expediently provided with a multi-part cover slide. The arrangement is such that one part of the cover slide of one fluid chamber is rigidly connected to the adjacent part of the cover slide of the other fluid chamber.

Structural Arrangement

Referring now to the drawings in detail illustrating a double brake with cover slides according to the present invention, one end face of the two-part brake housing 1 is fixedly connected for instance by screws with the transmission (not shown) to be braked. The runner 3, the blade chambers 4, 4a of which form images to each other, is mounted in overhung position on transmission shaft 2. In the stationary housing 1 opposite the runner blading there are arranged the housing chambers 5, 5a. The chambers 4, 5 and 4a, 5a together form the two fluid chambers of the brake. In both fluid chambers, the cover slides 6, 6a may be made effective and ineffective. The braking fluid passes through opening 7 of housing 1 and passages 8 into the fluid chambers 4, 5 and 4a, 5a and is discharged from the brake through opening 9 of housing 1.

Figure 2:
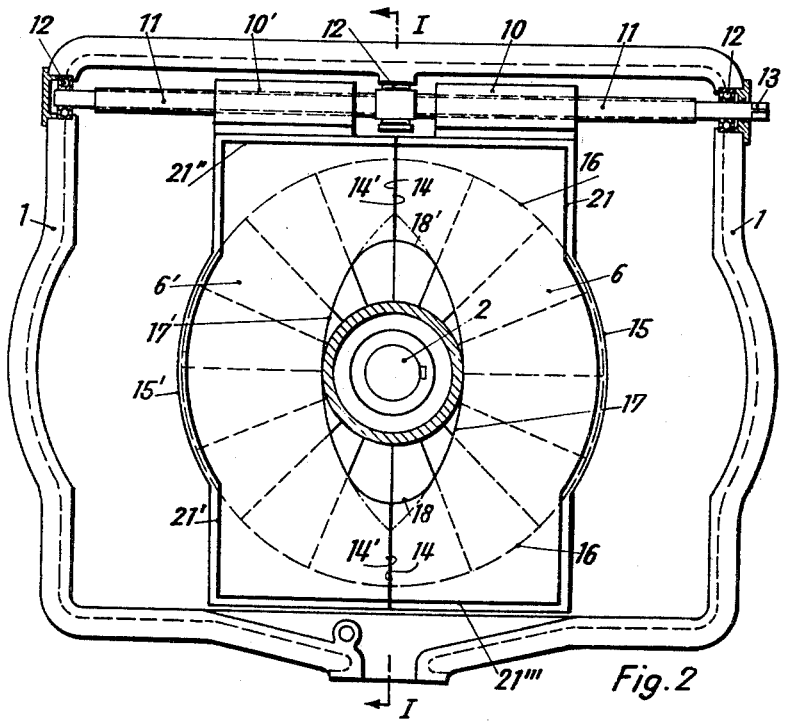
FIG. 2 is a transverse section of FIG. 1 taken along the line II—II of FIG. 1.

As will be evident from FIG. 2, the cover slide parts 6, 6' are provided with nuts 10, 10' engaged by a threaded spindle 11 each half of which is provided with a thread while one thread has a direction opposite to the direction of the other thread.

The spindle 11 is rotatably journalled in bearings 12 and has at one end a square head 13 by means of which the threaded spindle may be rotated for making the cover slide effective and ineffective. FIG. 2 shows the cover slide in its fully effective or engaged position which means that the brake is ineffective and the fluid chambers are empty. The slide edges 14, 14' will then engage each other at the upper and lower ends. The contour facing away from the brake shaft will have its intermediate range 15, 15' substantially register with the outer contour 16 of the blading. If now the cover slide is moved into its ineffective position, the intermediate range 17, 17' of the contour facing the brake shaft will substantially register with the outer circumference 16 of the blading, whereas the contour facing away from the brake shaft will snugly engage the inner surface of housing 1. Merely the parts 18, 18' of the contour facing the brake shaft, which parts have a radius shorter than half the outer diameter of the blading, will in the ineffective position of the cover slide extend into the blading in form of corners.

Figure 3:
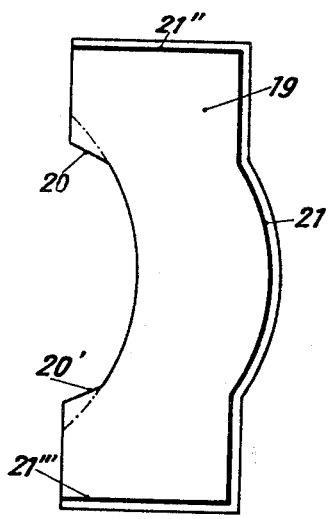
FIG. 3 is a modification of the cover slide or valve employed in connection with the arrangement of FIG. 1.

FIG. 3 shows a modified cover slide 19 in which in the outer range of the contour facing the brake shaft a radially inwardly offset straight edge 20, 20' is provided which reduces in a manner according to the invention the heretofore customary opening of the cover slide when the latter occupies its effective position.

In FIGS. 1 to 3, the seals 21, 21', 21'', 21''' are illustrated which are arranged on the cover slide 6, 6', 6a, 19 and engage corresponding counter surfaces on housing 1. In this way, a good seal will be obtained between the primary and secondary part, and air whirl losses otherwise occurring at these points will be avoided.

Figure 4:
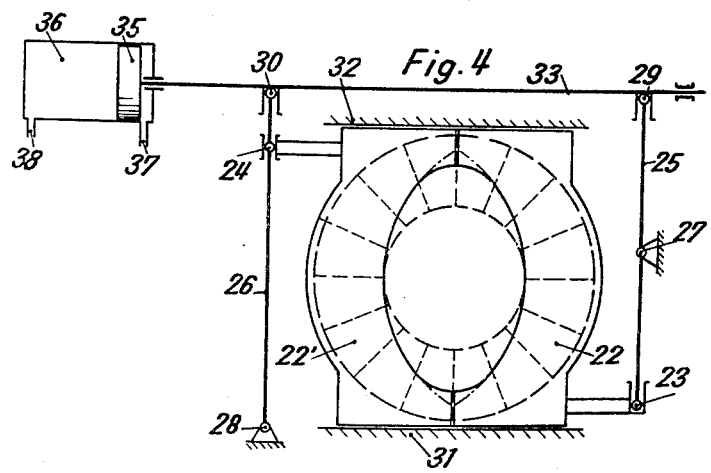
FIG. 4 is a two-part cover slide or valve with a diagrammatically illustrated lever system.

FIG. 4 illustrates the actuation of a cover slide by means of a lever mechanism. As will be seen from FIG. 4, the cover slide parts 22, 22' are provided with joints 23, 24 having rotatably journalled therein levers 25, 26. The levers 25, 26 are displaceably mounted in stationary guides 27, 28 and in guides 29, 30 provided on a piston rod 33. The cover slide parts are guided rectilinearly along the surfaces 31, 32. By alternately subjecting the surfaces of a servomotor piston 35 guided in a cylinder 36 to the action of a pressure fluid conveyed through conduits 37, 38, piston 35 will me moved and will move the cover slide parts into and out of effective position whereby the blading indicated by dash lines will be covered or freed.

FIG. 5 shows a single brake 40 similar to that shown in FIG. 1, the cover slide part 41 being capable of limited movement at right angles to the direction of displacement of the spindle nut 42. The limited movement is brought about by springs 44 while the cover slide part 41 is guided by pin 43 which engages in a hole provided in the cover slide part, the above springs pressing the cover slide part against the stationary housing 45 of brake 40. This arrangement is meant to provide good sealing between blade chambers 46, 47.

The housing 45 is flanged unto fluid transmission 48, which among other components comprises input shaft 49, shaft 50 to be braked, and output shaft 51. Input shaft 49 is connected through spur gear wheels 52, 53 to the primary parts of a fluid coupling 54 and a fluid torque converter 55, the secondary parts of both of which are rigidly connected to shaft 50, which in its turn is connected to output shaft 51 through spur gear wheels 56, 57. In this transmission shaft 50 is the high-speed shaft and therefore connected to the brake. With this arrangement, braking starts already at low speeds of output shaft 51, and the physical dimensions of the brake can be small.

It is, of course, to be understood that the present invention is, by no means, limited to the particular constructions shown in the drawings but also comprises any modifications within the scope of the appended claims.

What we claim is:

1. In a hydrodynamic brake: a primary part provided with blading means and confining primary fluid chamber means, a secondary part provided with blading means and confining secondary fluid chamber means, said secondary fluid chamber means forming with said primary fluid chamber means brake chamber means into which extend the blading means of said primary and secondary fluid chamber means, said brake chamber means being adapted to be filled with and emptied of actuating fluid, and multi-part slide means movable radially into said brake chamber means into a first position and having inner edge portions with straight edge sections for abutting engagement with each other in said first position, said slide means also being movable radially outwardly into a second position substantially out of said brake chamber means, those inner edge portions of said slide means which engage each other along said straight edge sections in said first position having a contour the central portion of which follows a circle having a radius at least approximately equaling the outer radius of the blading of said brake chamber means, the end portions of said contour being offset radially inwardly with regard to said circle.

2. A hydrodynamic brake according to claim 1, in which said secondary part is arranged stationarily, and which includes spring means continuously urging said slide means axially toward said secondary part.

3. The device claimed in claim 2, in which sealing means are mounted between the housing and said slide means.

4. A method of operating a hydrodynamic brake during braking and non-braking operations, said brake having a bladed primary part confining primary fluid chamber means, a bladed secondary part confining secondary fluid chamber means, and slide means movable radially of said brake into a first position for separating said primary and secondary fluid chamber means from each other, said slide means also being movable radially of the brake into a second position in which said primary and secondary chamber means communicate freely with each other, said method including the steps of: positioning said slide means in said second position and varying the filling of said primary and secondary chamber means for controlling the braking effect of said brake, completely emptying said primary and secondary chamber means to eliminate the braking effect of said brake, and following the emptying of said chamber means moving said slide means radially into said first position thereby to prevent movement of air between said primary and secondary chamber means so as to eliminate the braking effect that would be created by the said movement of the air.

5. The method of eliminating air turbulent losses in a hydrodynamic brake when the brake is driven and is empty of hydraulic fluid and is therefore in a non-braking condition, said brake comprising a bladed primary part confining primary hydraulic fluid chamber means and a bladed secondary part confining secondary hydraulic fluid chamber means, said method comprising the steps of: emptying the chamber of hydraulic fluid and substantially completely interrupting communication between said chamber means when, and only when, said chamber means are empty of hydraulic fluid.

References Cited in the file of this patent

UNITED STATES PATENTS

| | | |
|---|---|---|
| 1,059,837 | Coates | Apr. 22, 1913 |
| 1,249,261 | Walker | Dec. 7, 1917 |
| 1,992,911 | De La Mater | Feb. 26, 1935 |
| 2,267,852 | Walker | Dec. 30, 1941 |

FOREIGN PATENTS

| | | |
|---|---|---|
| 29,049 | Great Britain | Dec. 13, 1909 |
| 589,790 | Great Britain | June 30, 1947 |
| 734,024 | Great Britain | July 20, 1955 |